(12) United States Patent  (10) Patent No.: US 6,744,229 B2
Horng et al.                (45) Date of Patent:    Jun. 1, 2004

(54) SAFETY-GUARD DETECTIVE CIRCUIT OF A FAN MOTOR

(75) Inventors: Alex Horng, Kaohsiung (TW); Ying-Ya Lu, Kaohsiung Hsien (TW); Ming-Sheng Wang, Kaohsiung (TW)

(73) Assignee: Sunonwealth Electric Machine Industry Co., Ltd, Kaohsiung (TW)

( * ) Notice: Subject to any disclaimer, the term of this patent is extended or adjusted under 35 U.S.C. 154(b) by 0 days.

(21) Appl. No.: 10/107,457

(22) Filed: Mar. 28, 2002

(65) Prior Publication Data

US 2003/0184247 A1 Oct. 2, 2003

(51) Int. Cl.$^7$ ............................................ H02K 29/00
(52) U.S. Cl. ........................ 318/254; 318/782; 318/433; 318/138; 318/439; 361/7; 361/18
(58) Field of Search ................... 318/254, 138, 318/439, 433, 782; 361/7, 18

(56) References Cited

U.S. PATENT DOCUMENTS

| | | | | |
|---|---|---|---|---|
| 4,017,765 A | * | 4/1977 | Maisch | 361/88 |
| 4,849,850 A | * | 7/1989 | Brahms | 361/101 |
| 4,860,154 A | * | 8/1989 | Fazlollahi | 361/101 |
| 4,893,211 A | * | 1/1990 | Bynum et al. | 361/18 |
| 4,954,917 A | * | 9/1990 | Wirth | 361/98 |
| 4,985,666 A | * | 1/1991 | Nakabayashi | 318/434 |
| 5,077,824 A | * | 12/1991 | Nagata et al. | 388/819 |
| 5,192,901 A | * | 3/1993 | Gontowski, Jr. | 318/430 |
| 5,309,076 A | * | 5/1994 | Madsen et al. | 318/782 |
| 6,008,972 A | * | 12/1999 | Pietrobon | 361/93.1 |
| 6,452,349 B1 | * | 9/2002 | Hahn et al. | 318/254 |

FOREIGN PATENT DOCUMENTS

JP    2001037075    * 2/2001

* cited by examiner

*Primary Examiner*—Rita Leykin
(74) *Attorney, Agent, or Firm*—Bacon & Thomas PLLC

(57) ABSTRACT

A safety-guard detective circuit of a fan motor includes a resistor being adapted to limit a large current input into the motor driver circuit, and a discharge member being adapted to perform grounding to discharge the large current limited by the resistor. The resistor and the release member are commonly connected to the third lead of the motor driver circuit.

8 Claims, 5 Drawing Sheets

US 6,744,229 B2

SAFETY-GUARD DETECTIVE CIRCUIT OF A FAN MOTOR

BACKGROUND OF THE INVENTION

1. Field of the Invention

The present invention relates to a safety-guard detection circuit of a fan motor, and more particularly to the safety-guard detection circuit connected to a rotation detection terminal of a third lead of the fan motor to thereby avoid discharge breakdown and wire shorts at the driver IC input.

2. Description of the Related Art

FIG. 1 is a circuit diagram of a conventional driver circuit and a conventional rotation detection circuit (phantom lines) of a dc brushless motor.

As shown in FIG. 1, the conventional motor driver circuit 1 includes a driver IC, and two coils L1 and L2. A Hall effect sensor module and a control module (transistor) are built into the driver IC. The Hall sensor is adapted to detect changes in the magnetic field of the permanent magnet of the rotor, and the weak Hall voltage is amplified by the driver IC. The two output terminals OUT1 and OUT2 of the driver IC then alternatively output current to the two coils L1 and L2 so that the two coils L1 and L2 are excited to rotate the rotor. In this time, the two output terminals OUT1 and OUT2 of the driver IC simultaneously output two opposite phase square waves. The conventional rotation detection circuit generally includes a transistor Q1, and a resistor R1 to define an amplifier circuit. The resistor R1 is connected in series to the base of the transistor Q1 and the output terminal OUT2, while the collector of the transistor Q1 is predetermined as a rotation detection terminal, as well as a third lead.

FIG. 2 is a circuit diagram of a conventional driver circuit and a rotation detection terminal of a single phase dc brushless motor. As shown in FIG. 2, the conventional motor driver circuit 1 includes a Hall sensor IC1 and a driver IC2. The output terminal of the Hall sensor IC1 is connected to the input terminal of the driver IC2. The two output terminals of the driver IC2 are connected to a coil L1. An output terminal FG of the driver IC2 is predetermined as a rotation detection terminal, as well as a third lead.

During operation of the motor driver circuit, the third lead of the driver circuit of the dc brushless motor, as shown in FIGS. 1 and 2, is provided for connecting to a rotation detection circuit. In general, the third lead is reserved and exposed to thereby facilitate assembly operation of the motor. However, during assembly operation the third lead may possibly contact with a human body. Discharge breakdown will occur through the third lead as the human body may have considerable static electricity. Thus, the driver IC or the transistor of the motor will be damaged by the static electricity. Referring again to FIG. 1, during assembly operation, if the third lead is connected to a power source, a large current is directly input into the base of the transistor Q1 or the driver IC that must damage the transistor or results in a wire short of the driver IC. To avoid the occurrence of transistor damage and driver IC wire shorts during the assembly operation, a need exists for the third lead to have a safety-guard device, thereby enhancing the reliability of the motor function.

SUMMARY OF THE INVENTION

Accordingly, the present invention may improve the above-mentioned drawbacks, by connecting a third lead and a rotation detection terminal of the motor driver to a safety-guard detection circuit. Thus, when the human body contacts with the third lead during assembly operation of the motor, the safety-guard detection circuit is adapted to limit a large current input into the motor driver through the third lead. And a discharge member, a zener diode for example, is adapted to ground the large current to thereby avoid transistor damage and driver IC wire shorts.

The primary objective of the present invention is to provide a safety-guard detection circuit for a fan motor, wherein the motor driver is connected with a safety-guard detection circuit which is adapted to limit a large current input into the motor driver through the third lead when the human body contacts with the third lead during assembly operation of the motor, to thereby avoid transistor damage and driver IC wire shorts.

In accordance with the present invention, a safety-guard detection circuit of a fan motor includes a resistor for limiting a large current from being input into a motor driver circuit, and a discharge member for grounding the large current limited by the resistor. The resistor and the discharge member are commonly connected to a third lead of the motor driver circuit.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
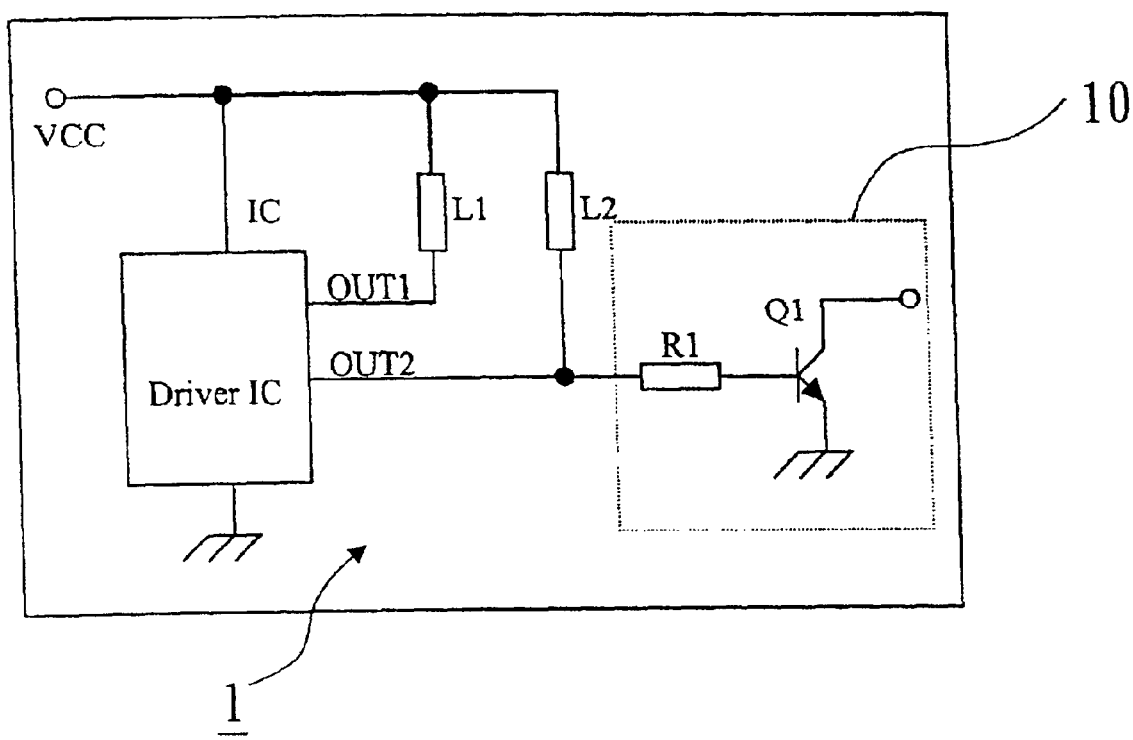
FIG. 1 is a circuit diagram of a conventional driver circuit and a conventional rotation detection circuit of a double phase dc brushless motor.

The safety-guard detection circuit of a fan motor in accordance with the present invention includes a resistor and a discharge member which are commonly connected to the third lead of the motor driver circuit. The resistor is used to limit a large current from being input into the motor driver circuit, and the discharge member, a zener diode for example, is used to ground the large current limited by the resistor. The safety-guard detection circuit of a fan motor in accordance with the present invention may be applied in a double phase dc brushless motor in accordance with the first, second, third and fourth embodiments of the present invention. At the same time, the safety-guard detection circuit of a fan motor in accordance with the present invention may be applied in a single phase dc brushless motor in accordance with the fifth, sixth and seventh embodiments of the present invention.

Some of the parts of the double phase dc brushless motor in accordance with the first, second, third and fourth embodiments of the present invention are the same as those of the conventional double phase dc brushless motor. The same parts of these embodiments will be adapted the same reference numerals for clarity. In addition, the same parts of the first, second, third and fourth embodiments of the present invention have the similar configuration and same functions as those of the conventional double phase dc brushless motor, and detailed descriptions thereof are omitted.

Figure 3:
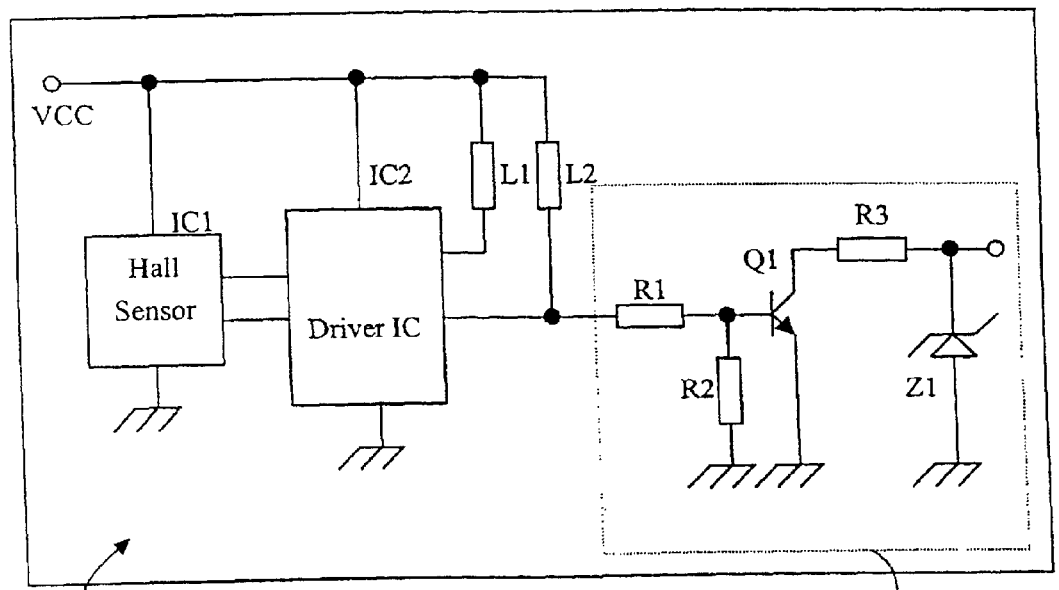
FIG. 3 is a circuit diagram of a safety-guard detection circuit of a fan motor and a driver circuit of a double phase dc brushless motor in accordance with a first embodiment of the present invention.

FIG. 3 is a circuit diagram of a safety-guard detection circuit of a fan motor and a drive circuit of a two-phase direct current brushless motor in accordance with a first embodiment of the present invention.

Referring to FIG. 3, the safety-guard detection circuit 10 of a fan motor comprises a first resistor R1, a second resistor R2, a third resistor R3, a transistor Q1, and a discharge member Z1. The safety-guard detection circuit 10 is connected to an output terminal, as well as third lead, of the driver IC2 of is the motor driver circuit 1, to thereby limit a large current from being input into the output terminal, so as to protect the driver IC2. The safety-guard detection circuit 10 has a fixed bias voltage provided by the first resistor R1 and the second resistor R2, and is used to open or cut off the base of the transistor Q1. After the voltage of the square wave signal output from the driver IC2 is divided by the first resistor R1 and the second resistor R2, the divided square wave signal is input into the base of the transistor Q1 for being amplified. The square wave signal as well as a rotation detection signal is amplified, so that the transistor Q1 is absolutely controlled in a saturation or cutoff state. The resistance ratio of the first resistor R1 and the second resistor R2 can be adjusted according to the features of the motor driver circuit 1, so the rotation detection circuit may have the optimum detection effect.

Again referring to FIG. 3, when the motor is driven, the driver IC2 of the motor driver circuit 1 outputs a voltage signal. After the voltage signal is divided by the first resistor R1 and the second resistor R2, the divided signal is input into the base of the transistor Q1 that absolutely controls the transistor Q in saturation or cutoff state.

Again referring to FIG. 3, the third resistor R3 is connected in series to the collector of the transistor Q1, which limits either any discharge breakdown or large current from being input into the collector due to a wire short. At the same time, a discharge member Z1 connects the base of the transistor Q1 to ground to thereby form a discharge passage between the base of the transistor Q1 and the ground. Consequently, the third resistor R3 limits a large current discharged from this discharge passage. Preferably, the discharge member Z1 is a zener diode. Thus, during assembling the motor, as human body is in contact with the third lead, the safety-guard detection circuit 10 may limit the large current through the third lead to input into the driver IC2 of the motor driver circuit 1. Meanwhile, the discharge member Z1 grounds this large current, thereby preventing the driver IC2 being damaged by discharge breakdown and wire short.

Again referring to FIG. 3, the third resistor R3 is connected in series to the collector of the transistor Q1. Thus, during actuating the transistor Q1, the voltage of the output logic low level is increased. In normal application, the signal current input into the collector of the transistor Q1 is usually smaller than 10 mA. If the resistance of the third resistor R3 is limited to smaller than 50Ω, the 10 mA current drops to slightly smaller than 0.5V by the 50Ω resistance. The total value of the voltage drop of 0.5V and the saturation voltage (about 0.2V) of the transistor Q1 is smaller than 0.7V so that the output still satisfies the specification of logic low level. Thus, the transistor Q1 of the safety-guard detection circuit 10 efficiently limits the input current into its collector and may also avoid discharge breakdown input. At the same time, the safety-guard detection circuit 10 provides a safe and stable signal detection function for the third lead.

Figure 4:
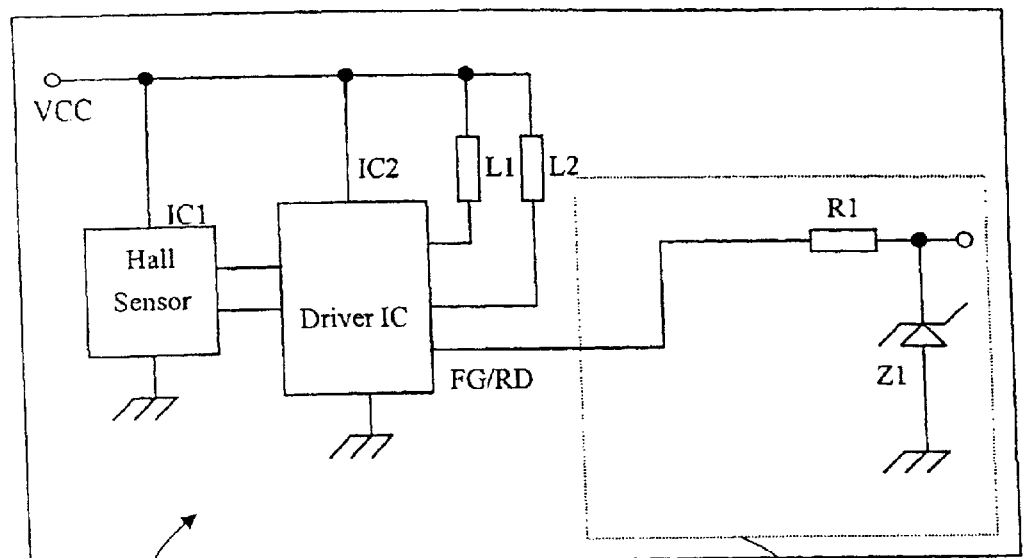
FIG. 4 is a circuit diagram of a safety-guard detection circuit of a fan motor and a driver circuit of a double phase dc brushless motor in accordance with a second embodiment of the present invention.
Figure 5:
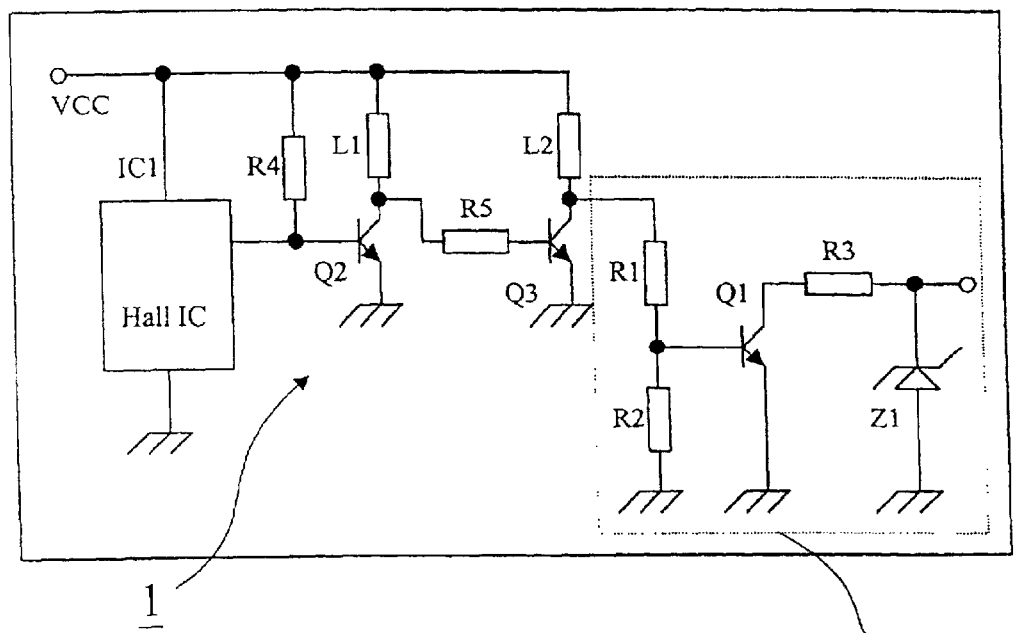
FIG. 5 is a circuit diagram of a safety-guard detection circuit of a fan motor and a drive circuit of a double phase dc brushless motor in accordance with a third embodiment of the present invention.
Figure 6:
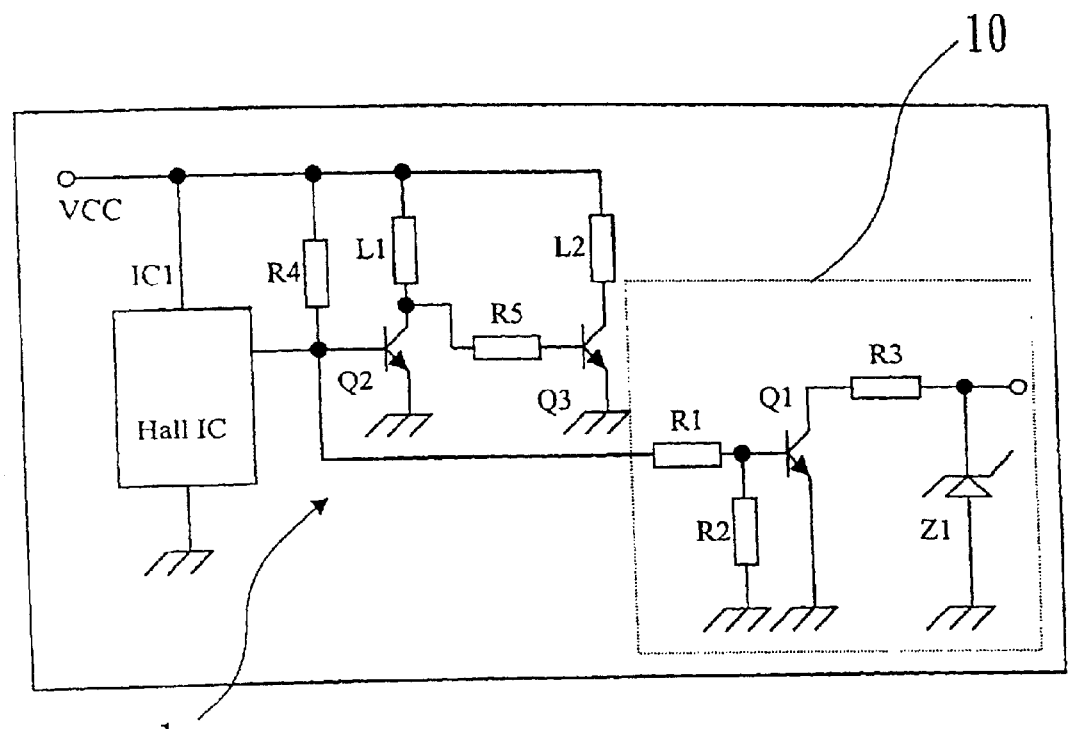
FIG. 6 is a circuit diagram of a safety guard detection circuit of a fan motor and a drive circuit of a double phase dc brushless motor in accordance with a fourth embodiment of the present invention.

FIG. 4 is a circuit diagram of a safety-guard detection circuit of a fan motor and a driver circuit of a double phase dc brushless motor in accordance with a second embodiment of the present invention. FIG. 5 is a circuit diagram of a safety-guard detection circuit of a fan motor and a driver circuit of a double phase dc brushless motor in accordance with a third embodiment of the present invention. FIG. 6 is a circuit diagram of a safety-guard detection circuit of a fan motor and a driver circuit of a double phase dc brushless motor in accordance with a fourth embodiment of the present invention.

Some of the parts of the safety-guard detection circuit in accordance with the second, third and fourth embodiments of the present invention are the same as that of the safety-guard detection circuit of the first embodiment. The same parts of these embodiments have been designated with the same reference numerals for clarity. In addition, the same parts of the second, third and fourth embodiments of the present invention have a similar configuration and the same functions as those of the first embodiment, and detailed descriptions thereof are omitted.

Referring to FIG. 4, the safety-guard detection circuit 10 of a fan motor and a driver circuit of a double phase dc brushless motor in accordance with a second embodiment of the present invention comprises a resistor R1, and a discharge member (such as zener diode) Z1. The safety-guard detection circuit 10 is connected to the output terminal FG/RD (such as the third lead) of the driver IC2, so as to prevent the output terminal FG/RD from being subjected to a large current. The resistor R1 is connected in series to the output terminal FG/RD of the driver IC2, so that the voltage of the output logic low level is increased. In a normal application, the output signal current of the driver IC2 is usually smaller than 10 mA. If the resistance of the resistor R1 is limited to be smaller than 50Ω, the current of 10 mA drops by slightly smaller than 0.5V due to the resistance of 50Ω. The total value of the voltage drop of 0.5V and the saturation voltage (about 0.2V) of the output terminal FG/RD is smaller than 0.7V, so that the output still satisfies the logic low level and thereby performs as the detection signal of the third lead.

Referring to FIG. 5, the safety-guard detection circuit 10 of a fan motor and a driver circuit of a double phase dc brushless motor in accordance with a third embodiment of the present invention comprises a first resistor R1, a second resistor R2, a third resistor R3, a transistor Q1, and a discharge member (such as zener diode) Z1. The safety-guard detection circuit 10 is connected to the collector of the transistor Q3, thereby preventing a large current from being input into the output terminal of the motor driver circuit 1.

Figure 7:
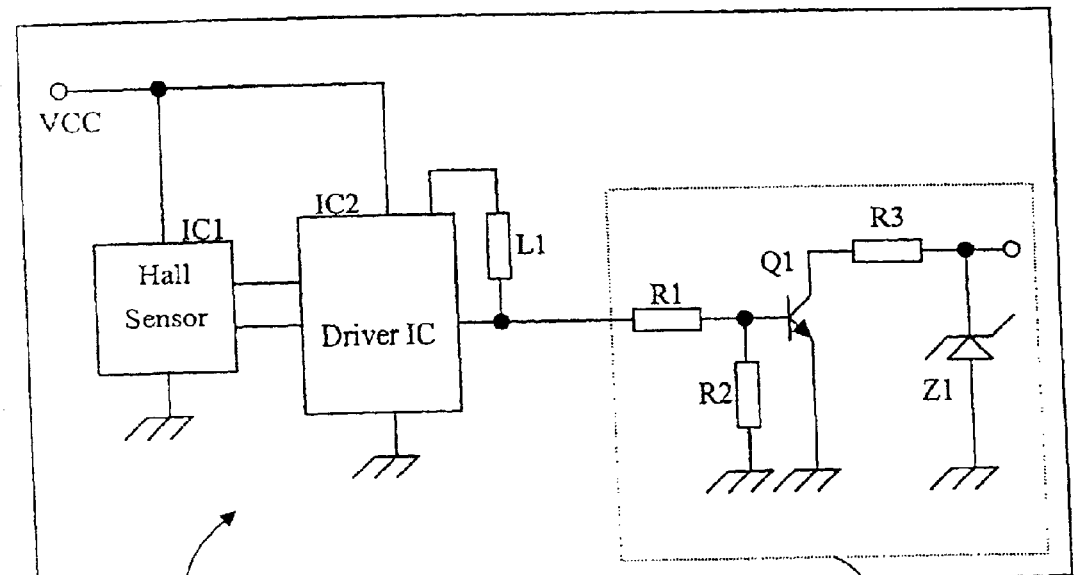
FIG. 7 is a circuit diagram of a safety-guard detection circuit of a fan motor and a drive circuit of a single phase dc brushless motor in accordance with a fifth embodiment of the present invention.
Figure 8:
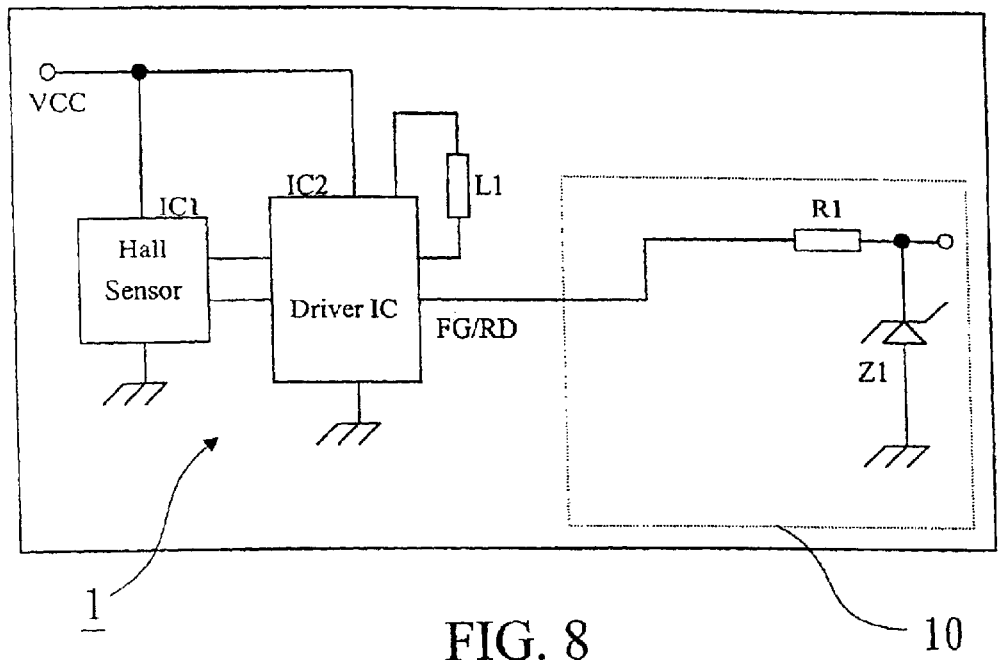
FIG. 8 is a circuit diagram of a safety-guard detection circuit of a fan motor and a drive circuit of a single phase dc brushless motor in accordance with a sixth embodiment of the present invention.
Figure 9:
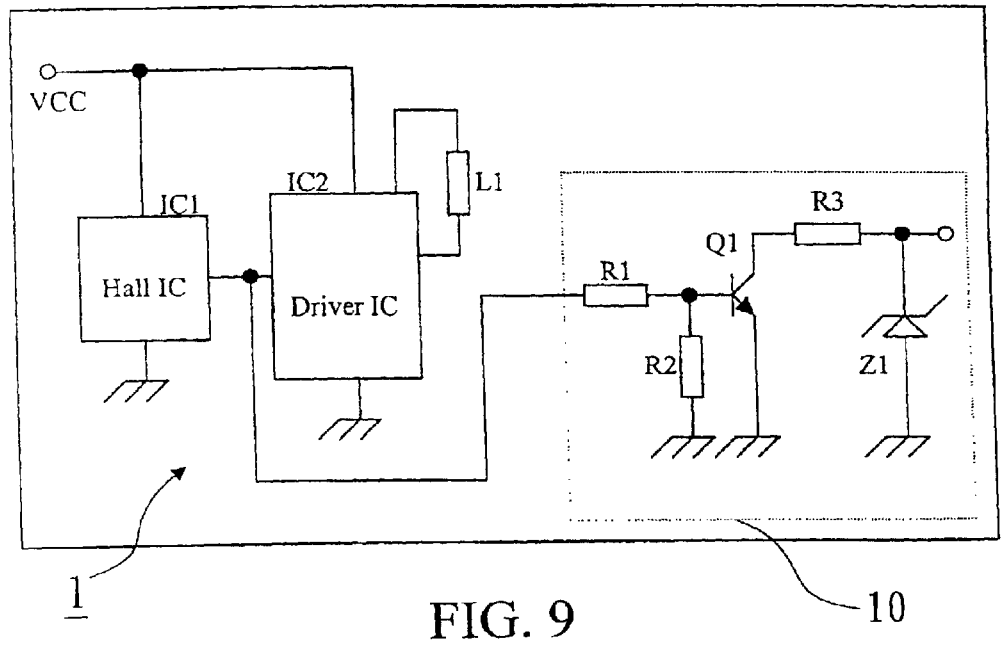
FIG. 9 is a circuit diagram of a safety-guard detection circuit of a fan motor and a drive circuit of a single phase dc brushless motor in accordance with a seventh embodiment of the present invention.

Referring to FIG. 6, the safety-guard detection circuit 10 of a fan motor and a drive circuit of a two-phase dc brushless motor in accordance with a fourth embodiment of the present invention comprises a first resistor R1, a second resistor R2, a third resistor R3, a transistor Q1, and a discharge member (such as zener diode) Z1. The safety-guard detection circuit 10 is connected to the output terminal of the hall member IC1, thereby preventing a large current from being input into the output terminal of the motor drive circuit 1. FIG. 7 is a circuit diagram of a safety-guard detection circuit of a fan motor and a driver circuit of a single phase dc brushless motor in accordance with a fifth embodiment of the present invention. FIG. 8 is a circuit diagram of a safety-guard detection circuit of a fan motor and a driver circuit of a single phase dc brushless motor in accordance with a sixth embodiment of the present invention. FIG. 9 is a circuit diagram of a safety-guard detection circuit of a fan motor and a driver circuit of a single phase dc brushless motor in accordance with a seventh embodiment of the present invention.

Some of the parts of the single phase dc brushless motor in accordance with the fifth, sixth and seventh embodiments of the present invention are the same as those of the conventional single phase dc brushless motor. The same parts of these embodiments will be designated by the same reference numerals for clarity. In addition, the same parts of the fifth, sixth and seventh embodiments of the present invention have a similar configuration and the same functions as those of the conventional single phase dc brushless motor, and detailed descriptions thereof are omitted.

Referring to FIG. 7, the safety-guard detection circuit 10 of a fan motor and a driver circuit of a single phase dc brushless motor in accordance with a fifth embodiment of the present invention comprises a first resistor R1, a second resistor R2, a third resistor R3, a transistor Q1, and a discharge member (such as zener diode) Z1. The safety-guard detection circuit 10 is connected to the output terminal (such as the third lead) of the driver IC2, thereby preventing a large current from being input into the output terminal of the driver IC2.

Referring to FIG. 8, the safety-guard detection circuit 10 of a fan motor and a drive circuit of a single phase dc brushless motor in accordance with a sixth embodiment of the present invention comprises a resistor R1, and a release member (such as zener diode) Z1. The safety-guard detection circuit 10 is connected to the output terminal FG/RD (such as the third lead) of the driver IC2, thereby preventing a large current from being input into the output terminal FG/RD of the driver IC2.

Referring to FIG. 9, the safety-guard detection circuit 10 of a fan motor and a driver circuit of a single phase dc brushless motor in accordance with a seventh embodiment of the present invention comprises a first resistor R1, a second resistor R2, a third resistor R3, a transistor Q1, and a discharge member (such as zener diode) Z1. The safety-guard detection circuit 10 is connected to the output terminal of the Hall IC1, thereby preventing a large current from being input into the output terminal of the Hall IC1.

Again referring to FIGS. 1 and 2, the conventional rotation detection circuit 10 of a dc brushless motor only includes a transistor Q1, and a resistor R1 to function as an amplification circuit. Thus, during assembly of the motor, the conventional rotation speed detection circuit 10 may be damaged by discharge breakdown and wire short.

Figure 2:
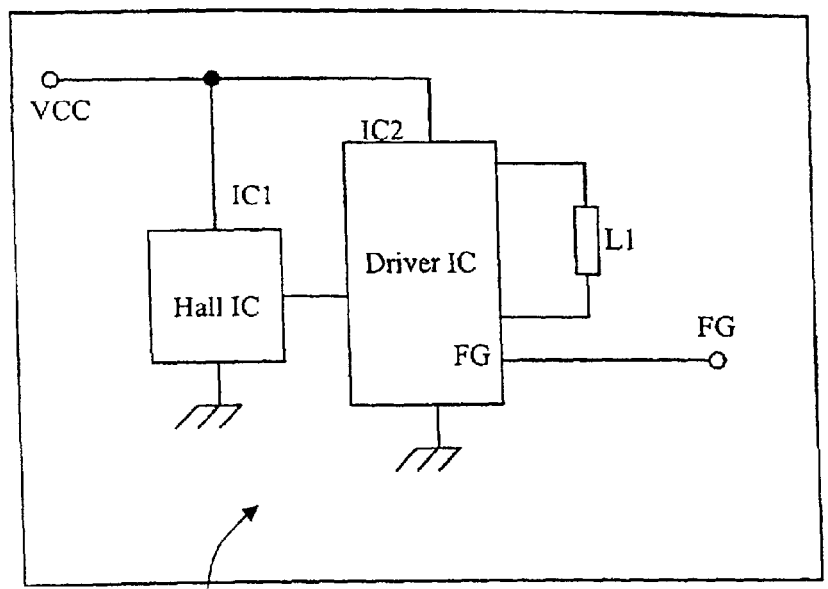
FIG. 2 is a circuit diagram of a conventional driver circuit and a rotation detection terminal of a single phase dc brushless motor.

Again referring to FIGS. 3–9, in comparison with the present invention and the conventional rotation detection circuit as shown in FIGS. 1 and 2, the safety-guard detection circuit 10 of a fan motor in accordance with the present invention at least comprises a resistor and a discharge member which are commonly connected to the third lead of the motor driver circuit 1. Thus, the resistor is adapted to prevent any large current from being input into the motor driver circuit, and the discharge member is adapted to perform grounding to discharge the large current limited by the resistor. In addition, the present invention has the effect of preventing discharge breakdown and wire shorts.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A safety-guard detection circuit for a fan motor applied to a driver circuit having an output terminal for detecting operation of a dc brushless motor, comprising:
   a resistor connected to the output terminal of the driver circuit, said resistor being adapted to limit a large current input into the motor driver circuit through the output terminal; and
   a discharge member connected to the output terminal of the driver circuit, said discharge member being connected to ground to discharge the large current limited by the resistor;
   wherein the motor driver circuit is protected by the safety-guard detection circuit, thereby preventing input of a large current to the motor driver circuit, and
   wherein the safety-guard detection circuit is selectively connected to one of:
   a collector of a transistor; and
   an output terminal of a Hall member of said driver circuit,
   whereby input of the large current to motor members is effectively limited.

2. The safety-guard detection circuit of a fan motor as claimed in claim 1, wherein the safety-guard detection circuit is applied to a single phase dc brushless motor.

3. The safety-guard detection circuit of a fan motor as claimed in claim 1, wherein the safety-guard detection circuit is applied to a single phase dc brushless motor.

4. The safety-guard detection circuit of a fan motor as claimed in claim 1, wherein the discharge member is a zener diode.

5. The safety-guard detection circuit of a fan motor as claimed in claim 1, further including a voltage drop circuit and a transistor, and wherein the voltage drop circuit is connected to a base of the transistor, the combination of the voltage drop circuit and the transistor is connected in series between the driver circuit and the safety-guard detection circuit, said voltage, and the voltage drop is adjustable according to various features of the driver circuit for enhancing a detection effect.

6. The safety-guard detection circuit of a fan motor as claimed in claim 5, wherein the voltage drop circuit consists of two resistors.

7. The safety-guard detection circuit of a fan motor as claimed in claim 5, wherein the safety-guard detective circuit is connected to the output terminal of the driver IC.

8. The safety-guard detection circuit of a fan motor as claimed in claim 1, wherein the discharge member is electrically connected with the resistor.

* * * * *